Aug. 16, 1927.
J. A. KINNARD
1,639,299
TEMPERATURE REGULATOR FOR INTERNAL COMBUSTION ENGINES
Filed Jan. 22, 1926
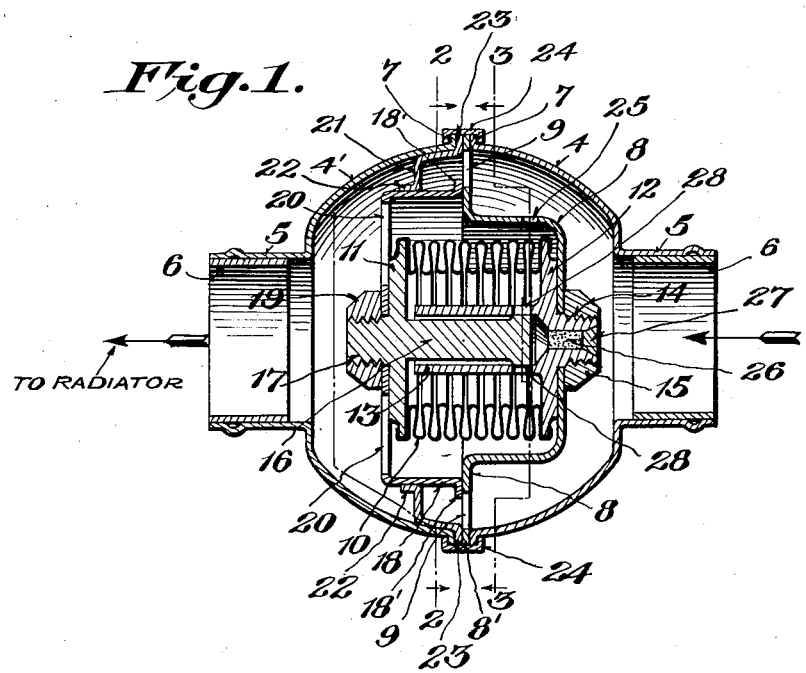
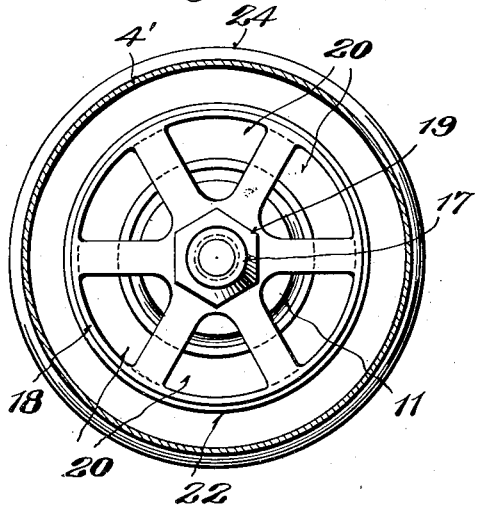 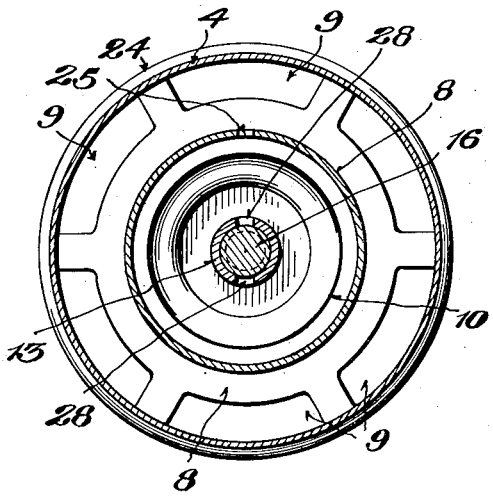
Inventor
James A. Kinnard
By Mauro, Cameron, Lewis & Kerkam
Attorneys Patented Aug. 16, 1927.

1,639,299

UNITED STATES PATENT OFFICE.

JAMES A. KINNARD, OF DETROIT, MICHIGAN, ASSIGNOR TO THE FULTON COMPANY, OF KNOXVILLE, TENNESSEE, A CORPORATION OF MAINE.

TEMPERATURE REGULATOR FOR INTERNAL-COMBUSTION ENGINES.

Application filed January 22, 1926. Serial No. 83,153.

This invention relates to temperature regulating devices used in connection with automobile and other internal combustion engines and more particularly to regulators of this kind which are interposed in the hose line between the engine jacket and the radiator.

When the automobile engine is cold, it is desirable to avoid circulating the water or other cooling medium through the radiator until the engine gets warmed up to the desired temperature, and to then have the cooling medium, as water, circulate through the radiator to avoid overheating of the engine. Various devices have heretofore been employed to effect this result. The most efficient of such devices have employed an expansible and collapsible vessel containing a thermostatic medium for controlling a valve in the conduit between the engine jacket and the radiator. In such devices, the thermostat element has been so mounted that the pump, employed to circulate the water or other cooling medium, will build up a relatively high pressure, particularly when the pump is speeded up. This results, according to the particular character of the system, in a tendency either to raise the temperature at which the thermostat operates or to lower such temperature, depending upon the relative effective areas of the valve and the thermostatic bellows (which is the form that the expansible and collapsible vessel employed usually assumes). The result of this is that the regulator does not operate at a fixed, predetermined temperature. Moreover, the construction of regulators heretofore employed has been such that their cost was considerable, due to the fashioning of the parts and the complicated assemblage.

The object of the present invention is to provide a regulator, comprising a thermostat in the form of a bellows-like expansible and collapsible vessel of resilient material, which shall operate at a fixed desired temperature to open or close the valve, as the case may be, in the conduit (usually in the form of a flexible hose) between the engine jacket and the radiator; which shall be largely composed of struck-up sheet metal parts, and which may be readily assembled.

With this object in view, the invention consists in interposing, in the hose line between the engine jacket and the radiator of an automobile or other engine, a casing preferably struck-up from sheet metal and supporting a thermostat of bellows-like construction in the axis of the hose line. A valve cooperates with the thermostat support to enclose this thermostat against the pump pressure when the valve is closed, except for a restricted, leakage by-pass. When the valve is open, the pressure of the water, or other cooling medium passing through the hose, is directed against the thermostatic bellows at an angle of 90° to its axis. The result of this is that when the valve is closed the pump pressure does not come in contact with the bellows, and when it is opened the pressure does not act in a direction to affect the proper thermostatic action of the bellows.

One embodiment of the inventive idea is, for the purpose of illustrating the invention, shown in the accompanying drawings, in which Fig. 1 is a central longitudinal section through the regulator;

Fig. 2 is a transverse section on the line 2—2 of Fig. 1; and

Fig. 3 is a transverse section on the line 3—3 of Fig. 1.

Referring to the drawings, in which like reference numerals indicate like parts throughout the several views, 4, 4' are two halves which together constitute the outer casing of the regulator, each of said parts being of approximately semi-spherical shape and preferably struck-up from sheet metal, and each being provided with hose couplings 5, 5 by means of which the hose may be connected thereto, said couplings being preferably reinforced by metal rings 6, 6 secured therein to prevent the collapsing of the couplings 5, 5 when the hose is clamped thereon. Each of the casing parts 4, 4' has an outwardly extending radial flange 7. Within the casing is a cup-shaped thermostat support 8, which is also provided with an outwardly extending radial flange 8', through which flange a series of openings 9 is provided. Within the cup-shaped support 8 is mounted an expansible and collapsible vessel 10, preferably of resilient metal and of bellows-like form, and having rigid end walls 11 and 12. The end wall 12 has a tubular guide member 13 extending axially within the bellows and a screw-threaded boss 14 extending outward through an opening in the axis of the cup-shaped member 8. A nut 15 screwed on to said boss serves to effectively secure the bellows within the cup-shaped support 8. The rigid end wall 11 of the bellows has an inwardly extending guide member 16 entering the guide member 13 on the end wall 12, and is provided with a screw-threaded boss 17 extending outwardly through a central opening in a cup-shaped valve 18. A nut 19 on the boss 17 effectively secures the valve to the rigid end wall 11 of the bellows.

The respective lengths of the two guide members 13 and 16, secured to the respective end walls of the bellows, is such that when the valve 18 is closed, the end wall 11 does not contact with the inwardly projecting end of the guide 13.

The valve 18 is cup-shaped and faces in the reverse direction from the cup-shaped support 8, and serves, in combination with the cup support 8, to entirely enclose the bellows when the valve itself is closed, see Fig. 1. The valve 18 is provided with a series of openings 20 to permit the cooling medium to circulate freely therethrough when the valve is open. The valve is provided with a radially extending annular flange 18' which, when the valve is closed, rests upon the flange of the cup 8 between the series of openings 9 and the axis of said cup.

The valve 18 is surrounded by an annular guide member 21 which has a longitudinally extending flange 22 snugly but slidably fitting the circumference of the valve and a radially extending flange 23 whose diameter is approximately that of the radially extending flanges 7 on the casing portions 4, 4'.

The flanges 7, 7 of the casing, 23 of the guide ring and 8' of the support 8, being all of approximately the same diameter, are clamped in a ring 24 and the joint between said ring and the casing parts is then effectively sealed, preferably by solder. The support 8 is provided with a by-pass leakage opening 25, whereby a slight circulation of water can be maintained at all times through the system even when the valve 18 is closed.

The boss 14 has an axial opening through which a thermosensitive liquid may be introduced into the bellows 10 after which the same is sealed by cork 26 and solder 27, and openings 28, 28 are provided in the guide member 13 to facilitate the passage of the liquid into the bellows 10. This thermosensitive fluid is preferably inserted and sealed in such a manner that the pressure inside the thermostat is less than the pressure outside, so that upon leakage or damage to the thermostat the resiliency in the flexible wall of the bellows will be sufficient to move the valve to a position of safety, that is, to its open position. Any other suitable means may be employed to effect this movement.

Since the pressure on the inside of the bellows wall is less than that of the medium surrounding said wall at all temperatures below which the thermostat becomes operative, it will be seen that there will be a pressure exerted on the valve that will hold the flange 18' of said valve tightly against the radially extending flange of the support 8, thus tending to completely prevent leakage of the cooling medium by the valve other than that which takes place through the by-pass 25. The thermostat is preferably made of such length that the flange 18' of the valve 18 will contact with the annular guide ring 21 when the valve is entirely open, thus providing an effective stop to the opening movement of the valve.

In operation, when the engine is cold, the parts will be in the position shown in Fig. 1, with the thermostatic bellows supported in the axis of the hose and protected from the pressure in the system by reason of the fact that it is enclosed in the cup-shaped support 8 and the valve 18. Circulation is permitted, however, through the restricted leakage by-pass 25, and when the temperature of the cooling medium rises to the desired degree, it causes the expansion of the thermostat and the moving of the valve 18 from contact with the flange of the cup-shaped member 8, when the circulating medium passes through the openings 9 in the flange of the cup 8 and the openings 20 of the valve 18. The extent of the movement of the valve from its seat will depend upon the temperature of the circulating medium. Except when the temperature is high, the valve will only be moved slightly from its seat, and the cooling medium, after passing through the openings 9, will be directed in a radial direction inwardly against the walls of the bellows 10, that is, at an angle of 90° to the axis of said bellows, and hence at an angle of 90° to the line of movement of the part actuated by said bellows, so that the pressure or velocity head does not act in opposition to the action of the bellows either in expansion or contraction thereof.

It will be seen that the mechanism is composed of parts, the major portion of which may be formed from struck-up sheet metal, that the construction is simple and inexpensive, and that, when the parts are assembled, the building up of pressure by the speeding up of the pump will have no tendency to prevent the regulator from acting at the desired temperature.

While, for the purpose of explaining the invention, the form of the device illustrated in the accompanying drawings has been described with some particularity, it will be readily understood by those versed in the art that various departures from the form thus described may be made without departing from the spirit of the invention, and such forms are intended to be included within the terms of the appended claims, to which reference is made for the purpose of defining the limits of the invention.

What is claimed is:

1. In a temperature regulating system for internal combustion engines comprising a hose line between the engine jacket and the radiator, the combination of a casing interposed in the hose line, a thermostat supported thereby in the axis of the hose line, a rectilinearly movable valve operatively connected to said thermostat, and means supporting said thermostat and cooperating with said valve to enclose said thermostat and protect it from the pressure in the hose line when the valve is closed.

2. In a temperature regulating system for internal combustion engines comprising a hose line between the engine jacket and the radiator, the combination of a casing interposed in and supported by the hose line, a cup-shaped thermostat support mounted in said casing, a thermostat comprising a resilient bellows mounted in said cup, and a cup-shaped valve operatively connected to said thermostat and cooperating with said support to enclose said thermostat when the valve is closed.

3. In a temperature regulating system for internal combustion engines comprising a hose line between the engine jacket and the radiator, the combination of a casing interposed in and supported by the hose line, a cup-shaped support mounted in said casing, a thermostat comprising a bellows with rigid end walls mounted in said cup, interiorly projecting coacting guide members on said end walls, and a cup-shaped valve mounted on one of said end walls and cooperating with said support to enclose said bellows and shut off the flow of circulating medium.

4. In a temperature regulating system for internal combustion engines comprising a hose line between the engine jacket and the radiator, the combination of two semispherical casing parts each having an annular radially extending flange, a thermostat support having a radial flange, an annular valve guide having a radial flange, means securing said flanges together, a thermostat carried by said support and a valve seating on said support and operatively connected to said thermostat.

5. In a temperature regulating system for internal combustion engines comprising a hose line between the engine jacket and the radiator, the combination of a casing having oppositely disposed hose couplings, a thermostat support in said casing, a thermostat carried by said support in the axis of the hose line and expanding and contracting along the said axis, a valve carried by said thermostat and cooperating with said support to enclose said thermostat when the valve is seated, an annular guide surrounding said valve and a shoulder on said valve and engaging said guide to limit the opening movement of the valve.

6. In a temperature regulating system for internal combustion engines comprising a hose line between the engine jacket and the radiator, the combination of a casing, a cup-shaped support in said casing, a thermostat comprising a bellows with rigid end walls mounted in the cup-like depression of said support, a boss on one of said end walls and extending through said cup, a nut engaging said boss and securing the thermostat in said cup, a cup-shaped valve with a central opening, a boss on the other end wall extending through said opening, and a nut on said boss securing the valve to said end wall.

7. In a temperature regulating system for internal combustion engines, a casing adapted to be interposed in the system between the engine jacket and the radiator, a cup-shaped thermostat support in said casing, a thermostat mounted in the depression of said support, and a cup-shaped valve connected to said thermostat and adapted to seat on said support.

8. In a temperature regulating system for internal combustion engines, a casing adapted to be interposed in the system between the engine jacket and the radiator, a cup-shaped thermostat support in said casing, a thermostat mounted in the depression of said support, a cup-shaped valve connected to said thermostat and adapted to seat on said support, and a guide in said casing for said valve.

9. In a temperature regulating system for internal combustion engines, a casing adapted to be interposed in the system between the engine jacket and the radiator, a cup-shaped thermostat support in said casing, a thermostat mounted in the depression of said support, and a cup-shaped valve connected to said thermostat and adapted to seat on said support, said valve cooperating with said support to enclose said thermostat when said valve is closed and to enforce circulation at right angles to the axis of said thermostat when said valve is open.

10. In a temperature regulating system for internal combustion engines, a casing adapted to be interposed in the system between the engine jacket and the radiator, a cup-shaped thermostat support in said casing, a thermostat mounted in the depression of said support, said support providing apertures for the flow of cooling medium, a cup-shaped valve connected to said thermostat and adapted to seat on said support, and a member coacting with said valve and preventing flow of cooling medium therearound.

11. In a temperature regulating system for internal combustion engines, a casing adapted to be interposed in the system between the engine jacket and the radiator, a cup-shaped thermostat support in said casing, a thermostat mounted in the depression of said support, said support providing apertures for the flow of cooling medium, a cup-shaped valve connected to said thermostat and adapted to seat on said support, and a member coacting with said valve and preventing flow of cooling medium therearound, said member cooperating with said valve to guide and limit its movements.

12. In a temperature regulating system for internal combustion engines, a casing adapted to be interposed in the system between the engine jacket and the radiator, a cup-shaped thermostat support in said casing, a thermostat mounted in the depression of said support, a cup-shaped valve connected to said thermostat and adapted to seat on said support, and means coacting with said valve whereby only its lateral wall is subjected to the pump pressure of the cooling medium when the valve is closed.

13. In a temperature regulating system for internal combustion engines, a casing adapted to be interposed in the system between the engine jacket and the radiator, said casing comprising sections secured together, a thermostat support clamped between said casing sections, a thermostat mounted on said support, and a rectilinearly movable valve connected to said thermostat, movable toward and away from said support.

14. In a temperature regulating system for internal combustion engines, a casing adapted to be interposed in the system between the engine jacket and the radiator, said casing comprising sections secured together, a valve guide clamped between said casing sections, a thermostat mounted in said casing, and a rectilinearly movable valve cooperating with said guide and connected to said thermostat.

15. In a temperature regulating system for internal combustion engines, a casing adapted to be interposed in the system between the engine jacket and the radiator, said casing comprising sections secured together, a thermostat mounted in said casing, a member clamped between said casing sections and a rectilinearly movable valve connected to said thermostat and movable at right angles to said member, said valve cooperating with said member to prevent flow of the cooling medium.

16. In a temperature regulating system for internal combustion engines, a casing adapted to be interposed in the system between the engine jacket and the radiator, said casing comprising sections secured together, a thermostat support and a second member clamped between said casing sections, a thermostat mounted on said support, and a valve connected to said thermostat and cooperating with said member to prevent flow of the cooling medium.

17. In a temperature regulating system for internal combustion engines, a casing adapted to be interposed in the water line between the engine jacket and the radiator, a thermostat support in said casing, a thermostat carried by said support axially of the water line, and a hollow cylindrical valve member surrounding said thermostat and adapted to seat on said support.

18. In a temperature regulating system for internal combustion engines, a casing adapted to be interposed in the water line between the engine jacket and the radiator, a thermostat support in said casing, a thermostat carried by said support axially of the water line, a hollow cylindrical valve member surrounding said thermostat and adapted to seat on said support, and a member cooperating with said valve member to prevent flow of the cooling medium therearound.

19. In a temperature regulating system for internal combustion engines, a casing adapted to be interposed in the water line between the engine jacket and the radiator, a thermostat support in said casing, a thermostat carried by said support axially of the water line, said support providing apertures adjacent its periphery for the flow of cooling medium therethrough, and a hollow cylindrical valve member open at both ends connected to and surrounding said thermostat, said valve member adapted to seat on said support inside of said apertures.

20. In a temperature regulating system for internal combustion engines, a casing adapted to be interposed in the water line between the engine jacket and the radiator, a thermostat support in said casing, a thermostat carried by said support axially of the water line, said support providing apertures adjacent its periphery for the flow of cooling medium therethrough, a hollow cylindrical valve member open at both ends connected to and surrounding said thermostat, said valve member adapted to seat on said support inside of said apertures, and a member surrounding said valve member and cooperating therewith to prevent flow of the cooling medium therearound.

In testimony whereof I have signed this specification.

JAMES A. KINNARD.

CERTIFICATE OF CORRECTION.

Patent No. 1,639,299. Granted August 16, 1927, to

JAMES A. KINNARD.

It is hereby certified that the above numbered patent was erroneously issued to The Fulton Company, of Knoxville, Tennessee, a corporation of Maine as assignee, whereas said patent should have been issued to The Fulton Sylphon Company, of Knoxville, Tennessee, a corporation of Delaware, said corporation being assignee by mesne assignments of the entire interest in said invention as shown by the records of assignments in this office; and that the said Letters Patent should be read with this correction therein that the same may conform to the record of the case in the Patent Office.

Signed and sealed this 4th day of October, A. D. 1927.

Seal.

M. J. Moore,
Acting Commissioner of Patents.